July 25, 1950 C. E. SNYDER 2,516,602
APPARATUS FOR SPLICING TUBES
Filed Nov. 1, 1947
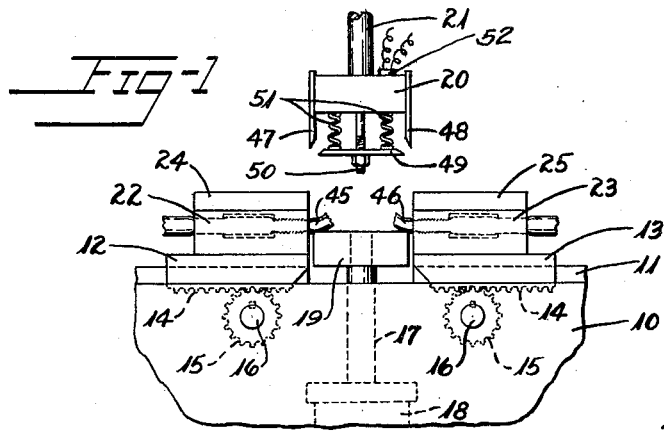
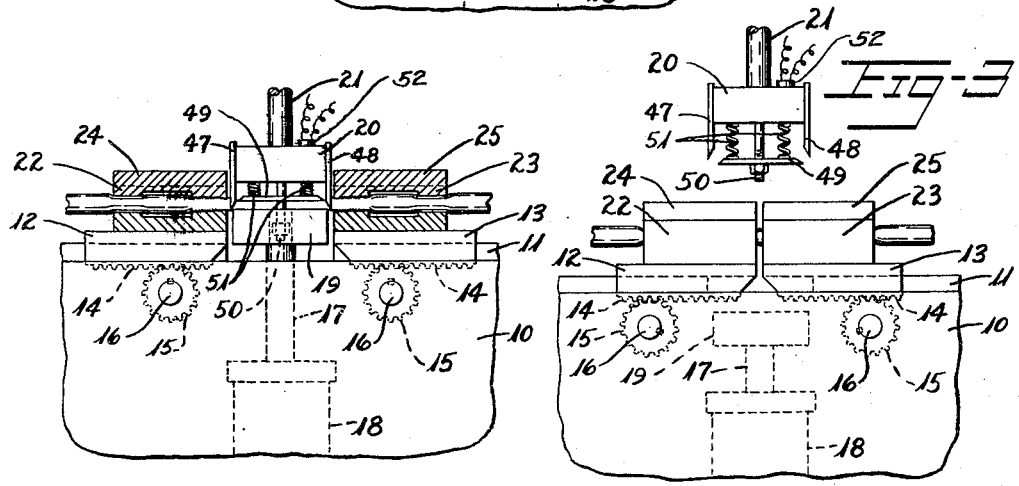
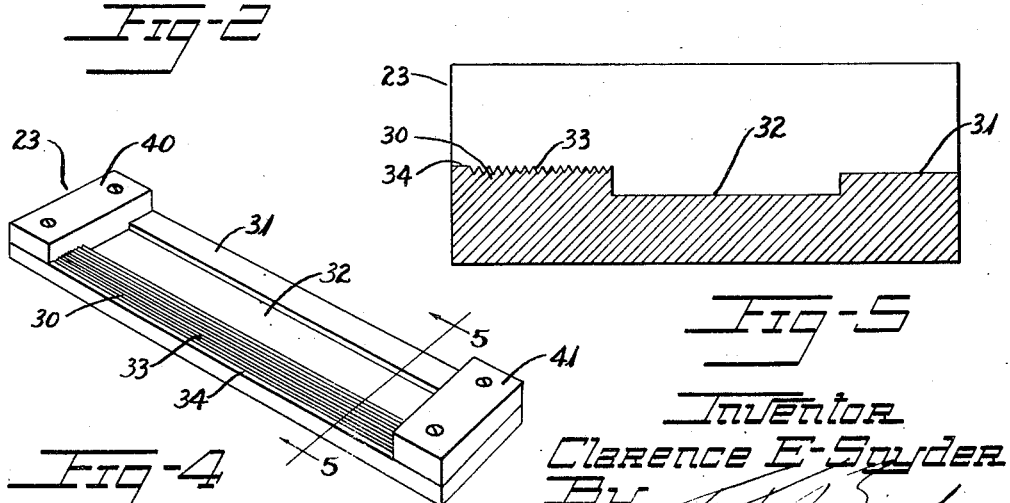
Inventor
Clarence E. Snyder
By
Atty.

Patented July 25, 1950

2,516,602

UNITED STATES PATENT OFFICE 2,516,602

APPARATUS FOR SPLICING TUBES

Clarence E. Snyder, Akron, Ohio, assignor to The B. F. Goodrich Company, New York, N. Y., a corporation of New York Application November 1, 1947, Serial No. 783,513

9 Claims. (Cl. 164—52)

This invention relates to apparatus for splicing tubes and is especially useful in the splicing of tire inner tubes.

In the manufacture of inner tubes for tires, the practice heretofore has been to extrude a tube of unvulcanized rubber or other rubber-like material, to cut the tube approximately to length, and then to trim and butt-splice the two ends of the tube together in a splicing press.

Heretofore difficulties have been experienced in the splicing of tubes with the presses used heretofore in that thinning of the wall has sometimes occurred at the splice due to differences in width and thickness of the flattened tube ends at the splice and offset of the tube ends with each other.

Further difficulties have been experienced from slippage of the clamped tube ends when pressure was applied to force them into adhesive relation to each other, resulting in defective splices due to variation of splice strength at different portions of the splice, and causing increased manufacturing difficulties during later operations as well as contributing to the production of defective tubes. These difficulties have been especially present in the manufacture of tubes of synthetic rubber and with tubes of irregular wall thickness.

It is an object of the present invention to provide for overcoming the foregoing and other difficulties.

Other objects are to provide firm gripping of the tube ends with application of relatively light gripping pressure, to prevent objectionable flow of the material in a direction normal to the plane of the splice, to provide support of the tube at a position close to the clamping area, to support and grip the tube in a manner to obtain splicing pressure uniformly across the width of the flattened tube, and to prevent lifting of the ends beyond the clamps.

These and other objects will appear from the following description and the accompanying drawings.

Of the drawings,

Fig. 1 is a front elevation of the operating portion of a tube splicing machine constructed in accordance with and embodying the invention, with the tube ends clamped therein.

Fig. 2 is a similar view, partly in section showing the cutting blades in operation.

Fig. 3 is a similar view showing the cutting blades raised and the clamping members in splicing position.

Fig. 4 is a perspective view of one of the lower clamping jaws.

Fig. 5 is a sectional view taken on line 5—5 of Fig. 4.

Referring to the drawings, the numeral 10 designates the frame of a tube splicing machine which is formed on its upper face with a guideway 11 on which a pair of carriages 12, 13 are slideably mounted for movement toward and from each other. Each carriage has a rack 14 formed thereon which engages a pinion 15 fixed to a shaft 16 journaled in the frame and providing such movement.

A cutting block 19 is supported between the carriages, by the piston rod 17 of a pressure fluid operated cylinder 18 whereby it can be raised to a level with the clamping jaws, as seen in Figs. 1 and 2, or may be retracted, as seen in Fig. 3 for permitting the clamping jaws to be moved to splicing position.

The cutting head 20 is supported above and between the carriages 12, 13 in alignment with the cutting block 19 by a piston rod 21 operated by a cylinder (not shown) in a vertical direction.

The lower clamping jaws 22, 23 are removeably secured to the carriages 12, 13 respectively while the upper jaws 24, 25, which are also replaceable, are adapted to be raised and lowered therefrom by any suitable mechanism, for placing of the tube ends and removal of the spliced tube.

To provide for firmly gripping the tube ends and at the same time restricting movement of the material axially of the tube ends away from the cutting position, each of the clamping jaws 22, 23, 24 and 25 is formed with a high primary clamping portion 30, parallel to and adjacent the line of cut, and a lower secondary clamping portion 31 spaced therefrom away from the cutting position by a clearance groove 32. The high primary clamping portion, for firm gripping of the tube adjacent the cutting position, is formed with coarse serrations 33 extending parallel to the plane of the splice and entirely across the clamping face engaged by the tube and spaced from the cutting position face of the clamp by a narrow land 34 equal in height to that of the top of the serrations. Preferably the grooves are about .027" wide and terminate in sharp edges, the grooves each having sides at substantially 60° to each other. The arrangement is such that the tube end is firmly clamped at the cutting face entirely across its width by the narrow lands 34 and the serrations 33 hold the material against flow axially of the tube away from the splice with a minimum of pressure due to their small area of contact. Each of the clamp jaws 22, 23 is formed with end blocks 40, 41 which are preferably made separately in order to permit machining of the serrations or ribs 33 of such length as to extend entirely across the face of the jaw between the blocks to provide for secure clamping of the tube entirely across its width against shifting when splicing pressure is applied to the tube ends. The blocks 40, 41 are securely fastened in place to limit lateral spread of the tube ends and to guide the upper jaws.

As the clamping jaws are removable for replacement by similar jaws for splicing tubes of different sizes and therefore are not entirely free from rocking movement, secondary jaws are provided to engage the tube ends at positions more remote from the splicing position and thereby assist in preventing such rocking of the jaws under pressure and consequent nonuniform clamping.

The lower secondary clamping face 31 also clamps the tube more lightly at a position more remote from the splice, while the clearance groove 32 permits some displacement of the tube walls between the clamping surfaces 30 and 31 accommodating any displacement of air from between the tube walls at the clamping surfaces. As the serrations extend parallel to the splice or crosswise of the tube and entirely across the same displacement is generally axial of the tube and little force is applied tending to spread the tube by displacement of material after the tube is flattened to a position where its inner walls contact each other, the stop blocks 40, 41 preventing widening of the tube ends by flow of material.

The upper clamping jaws are similarly formed with serrated primary clamping faces and secondary smooth faces separated therefrom by a groove. These jaws are of such length as to fit between the blocks 40, 41 of the lower clamping jaws and the serrations extend entirely across their primary clamping faces.

In each of the clamping jaws 22, 23, 24 and 25 the secondary clamping faces are made slightly above the level of the bottoms of the grooves of the primary clamping faces in order to compensate for the displacement of rubber by the serrations and provide equalized clamping.

When the tube ends are clamped between the jaws, there is sometimes a tendency for the extending portions of the tube ends beyond the clamps toward the tube ends to raise when clamped, as indicated at 45, 46 in Fig. 1, contributing to cut ends not square with axis of the tube ends. To prevent this, the upper cutting member 20 which has cutting blades 47, 48 secured thereto, may be provided with a pressure plate 49 therebetween. The pressure plate is suspended on guide rods 50 from the cutting member 20 and compression coil springs 51 are provided between the pressure plate and the cutting member to resiliently hold the pressure plate below the cutting blades and cause it to flatten the tube ends in advance of cutting them, clearance cavities being provided in the cutting block 19 for receiving the guide rods 50 as indicated in Fig. 1. An electric heating element 52 is provided in the cutting member 20 to heat the knives.

In the operation of the apparatus, with the cutting member 20 elevated, the jaws 24, 25 raised, and the block 19 in raised position, the ends of the tube are placed over the jaws 22, 23 and extending slightly over the block 19. The jaws 24, 25 are then lowered upon the tube ends clamping them in place. The secondary clamping faces of the clamping jaws, engage the tube ends at positions spaced from the primary clamping faces and assist in leveling the clamping jaws so that the primary clamping faces engage the tube ends evenly throughout their extent, while the serrations firmly grip the tube ends against axial displacement during splicing. The cutting member 20 is then lowered, the pressure plate contacting and flattening the tube ends against the block 19, and the knives 47, 48 trimming the tube ends. The cutting member 20 is then raised, the block 19 lowered, and the carriages 12, 13 moved toward each other to press the tube ends against each other to splice them. Jaws 24, 25 are then raised to remove the spliced tube.

Variations may be made without departing from the scope of the invention as it is defined by the following claims.

I claim:

1. Apparatus for splicing tubes, said apparatus comprising a pair of jaws for holding an end of a tube adjacent a line of cut during a splicing operation, said jaws having marginal stops thereon for laterally aligning the tube end and serrations extending entirely across their tube clamping surfaces between said stops adjacent and parallel to the line of cut.

2. Apparatus for splicing tubes, said apparatus comprising a pair of jaws for holding an end of a tube adjacent a line of cut during a splicing operation, said jaws having marginal stops thereon for laterally aligning the tube end and serrations extending entirely across their tube clamping surfaces between said stops adjacent and parallel to the line of cut, said serrations being spaced from the line of cut by a narrow smooth land.

3. Apparatus for splicing tubes, said apparatus comprising a pair of jaws for holding an end of a tube therebetween adjacent a line of cut during a splicing operation, said jaws each comprising a primary clamping surface adjacent the line of cut and a lower secondary clamping surface spaced therefrom in a direction away from the line of cut.

4. Apparatus for splicing tubes, said apparatus comprising a pair of jaws for holding an end of a tube therebetween adjacent a line of cut during a splicing operation, said jaws each comprising a primary clamping surface adjacent the line of cut and a lower secondary clamping surface spaced therefrom in a direction away from the line of cut, said clamping surfaces being separated by a clearance groove.

5. Apparatus for splicing tubes, said apparatus comprising a pair of jaws for holding an end of a tube therebetween adjacent a line of cut during a splicing operation, said jaws each comprising a primary clamping surface adjacent the line of cut and a lower secondary clamping surface spaced therefrom in a direction away from the line of cut, said primary clamping surface having serrations extending parallel to the line of cut.

6. Apparatus for splicing tubes, said apparatus comprising a pair of jaws for holding an end of a tube therebetween adjacent a line of cut during a splicing operation, said jaws each comprising a primary clamping surface adjacent the line of cut and a lower secondary clamping surface spaced therefrom in a direction away from the line of cut, said primary clamping surface having serrations extending parallel to the line of cut, said serrations being spaced from the line of cut by a narrow flat land flush with the tops of the serrations.

7. Apparatus for splicing tubes, said apparatus comprising a cutting block, a cutter head above said block for cooperation therewith and having a blade thereon at the line of cut, a spring supported pressure plate on said cutter head for straightening the tube ends in advance of cutting, and a pair of clamping jaws for holding an end of a tube therebetween adjacent the line of cut, said jaws each comprising a pair of marginal stops for laterally aligning a tube end a primary clamping surface adjacent the line of cut between said marginal stops and a lower secondary clamping surface spaced therefrom in a direction away from the line of cut.

8. Apparatus for splicing tubes, said apparatus comprising a cutting block, a cutter head above said block for cooperation therewith and having a blade thereon at the line of cut, a spring supported pressure plate on said cutter head for straightening the tube ends in advance of cutting, and a pair of clamping jaws for holding an end of a tube therebetween adjacent the line of cut, said jaws each comprising a pair of marginal stops for lateraly aligning a tube end a primary clamping surface adjacent the line of cut between said marginal stops and a lower secondary clamping surface spaced therefrom in a direction away from the line of cut, said primary clamping surface having serrations extending parallel to the line of cut.

9. Apparatus for splicing tubes, said apparatus comprising a cutting block, a cutter head above said block for cooperation therewith and having a blade thereon at the line of cut, a spring supported pressure plate on said cutter head for straightening the tube ends in advance of cutting, and a pair of clamping jaws having marginal stops for laterally aligning the tube end, pressure clamping surfaces therebetween for holding an end of a tube therebetween adjacent the line of cut and a lower secondary clamping surface spaced therefrom in a direction away from the line of cut, said primary clamping surfaces having parallel serrations extending between said marginal stops parallel to the line of cut, said serrations being spaced from the line of cut by a narrow flat land flush with the tops of the serrations.

CLARENCE E. SNYDER.

REFERENCES CITED

The following references are of record in the file of this patent:

UNITED STATES PATENTS

| Number | Name | Date |
| --- | --- | --- |
| 648,976 | Mourad | May 8, 1900 |
| 1,392,871 | Heffelfinger | Oct. 4, 1921 |
| 1,851,800 | Bogopolsky | Mar. 29, 1932 |
| 1,976,834 | Carland et al. | Oct. 16, 1934 |
| 2,253,280 | Lormor | Aug. 19, 1941 |